United States Patent
Boussant-Roux et al.

(10) Patent No.: US 8,143,182 B2
(45) Date of Patent: *Mar. 27, 2012

(54) FUSED CERAMIC PARTICLE

(75) Inventors: Yves Boussant-Roux, Montfavet (FR); Emmanuel Nonnet, Sarrians (FR)

(73) Assignee: Saint-Gobain Centre de Recherches Et d'Etudes Europeen, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/936,687

(22) PCT Filed: Apr. 7, 2009

(86) PCT No.: PCT/FR2009/050589
§ 371 (c)(1),
(2), (4) Date: Dec. 7, 2010

(87) PCT Pub. No.: WO2009/136055
PCT Pub. Date: Nov. 12, 2009

(65) Prior Publication Data
US 2011/0105296 A1    May 5, 2011

(30) Foreign Application Priority Data
Apr. 11, 2008 (FR) .................... 08 52431

(51) Int. Cl.
C04B 35/48     (2006.01)
C04B 35/484    (2006.01)
C04B 35/488    (2006.01)
C04B 35/653    (2006.01)
C09C 1/68      (2006.01)
B02C 17/20     (2006.01)

(52) U.S. Cl. ......... 501/104; 51/309; 252/70; 106/286.1; 106/286.4; 106/286.5; 106/286.8; 106/415; 106/461; 106/467; 501/94; 501/118; 501/119

(58) Field of Classification Search ............. 106/286.1, 106/286.4, 286.5, 286.8, 415, 461, 467; 501/94, 501/118, 119, 104; 51/309; 252/70
See application file for complete search history.

(56) References Cited

U.S. PATENT DOCUMENTS

| 4,106,947 | A |   | 8/1978  | Recasens et al. |
|-----------|---|---|---------|-----------------|
| 4,450,184 | A | * | 5/1984  | Longo et al. .................. 427/453 |
| 5,468,427 | A | * | 11/1995 | Stangle et al. ................. 264/3.4 |
| 5,502,012 | A |   | 3/1996  | Bert et al. |
| 5,922,801 | A | * | 7/1999  | Bailey et al. .................. 524/437 |
| 6,335,083 | B1 | * | 1/2002 | Kasai et al. ................... 428/143 |
| 6,797,203 | B2 | * | 9/2004 | Vlach et al. ....................... 264/8 |
| 7,811,496 | B2 | * | 10/2010 | Celikkaya et al. ............ 264/232 |
| 2010/0016145 | A1 |  | 1/2010 | Boussant-Roux et al. |

FOREIGN PATENT DOCUMENTS

| EP | 0662 461 A1 |   | 7/1995 |
|----|-------------|---|--------|
| FR | 2 320 276 A1 |  | 3/1977 |
| JP | 60-243245 A | * | 12/1985 |
| WO | WO 01/23324 A1 |  | 4/2001 |
| WO | WO 2008/043966 A2 | | 4/2008 |

OTHER PUBLICATIONS

International Search Report issued in corresponding International Application No. PCT/FR2009/050589, mailed Jun. 4, 2010. (with English-language translation).
Written Opinion of the International Searching Authority issued in corresponding International Application No. PCT/FR2009/050589, mailed Jun. 4, 2010. (with English-language translation).
May 13, 2011 Office Action from U.S. Appl. No. 12/444,065.

\* cited by examiner

*Primary Examiner* — Anthony J Green
(74) *Attorney, Agent, or Firm* — Oliff & Berridge, PLC

(57) ABSTRACT

The present invention provides a fused ceramic particle, having the following chemical composition, in percentages by weight based on the oxides and for a total of 100%:

50%<$ZrO_2$+$HfO_2$<70%;
10%<$SiO_2$<30%;
6.5%<$MgO$<9.5%;
$Al_2O_3$ in a quantity such that the $MgO/Al_2O_3$ weight ratio is in the range 2.4 to 6.6;
0.1%<$Y_2O_3$;
$CeO_2$<10%; and
less than 0.6% of other oxides.

Use in particular as milling agents, wet medium dispersion agents, propping agents, heat exchange agents, or for the treatment of surfaces.

15 Claims, No Drawings

FUSED CERAMIC PARTICLE

FIELD OF THE INVENTION

The present invention relates to novel particles, especially in the form of beads, formed from fused ceramic, to a method of producing said beads, and to the use of said particles as milling agents, wet medium dispersing agents or for surface treatments.

PRIOR ART

The minerals industry employs beads for fine milling of substances that have been dry pre-milled using traditional methods, in particular for calcium carbonate, titanium oxide, gypsum, kaolin, and iron ore.

The paint, ink, dye, magnetic lacquers, and agrochemical compound industries use such beads to disperse and homogenize various liquid and solid constituents.

Finally, the surface treatment industry employs such particles or beads, in particular for metallic mold cleaning operations (in the production of bottles, for example), for deburring parts, for descaling, for the preparation of a support for coating, for shot peening and for peen forming, etc.

Conventionally, the particles are substantially spherical and 0.1 mm [millimeter] to 4 mm in size in order to serve all of the markets described above. So that they can be used in those three types of application, they must in particular have the following properties:

chemical and color inertness as regards the treated products;
shock resistance;
wear resistance;
low abrasivity for the equipment, in particular the agitation means and tanks, or the projection means; and
a small open porosity for easy cleaning.

There is a variety of types of particles on the market, particularly beads, especially in the micro-milling field:

round-grain sand, such as sand from the supplier OTTAWA, for example, is a natural, cheap product, but is unsuitable for modern mills, since they are pressurized and have a high throughput. Sand has low strength, low density, variable quality, and is abrasive as regards the equipment.

glass beads, which are widely used, have better strength, lower abrasivity and are available over a wider range of diameters.

metal beads, especially formed from steel, have insufficient inertness as regards the treated products, and in particular cause pollution of mineral fillers and graying of paints, and their density is too high, requiring special mills that in particular demand higher power consumption, heat up greatly, and put high mechanical stress on the equipment.

Ceramic beads are also known. Such beads have better strength than glass beads, higher density, and excellent chemical inertness. Different types can be distinguished:

sintered ceramic beads obtained by cold forming a ceramic powder and then consolidating by firing at high temperature; and ceramic beads known as "fused" beads, generally obtained by melting ceramic components, forming spherical droplets from the molten material, then solidifying said droplets.

The vast majority of fused beads have a zirconia-silica ($ZrO_2$—$SiO_2$) type composition where the zirconia is crystallized in the monoclinic form and/or partially stabilized (by appropriate addition), the silica and also a portion of any additives form a vitreous phase bonding the crystals of zirconia. Fused ceramic beads offer optimized properties for milling, namely good mechanical strength, high density, chemical inertness, and low abrasivity as regards the milling equipment.

By way of example, fused zirconia based ceramic beads and their use in milling and dispersion are described in FR-A-2 320 276 and EP-A-0 662 461. Those documents describe the influence of $SiO_2$, $Al_2O_3$, MgO, CaO, $Y_2O_3$, $CeO_2$, and $Na_2O$ on the principal properties, especially on the properties of crush strength and abrasion hardness. Example 11 of EP-A-0 662 461 presents a zirconia content of more than 70°% and an Mgo content of less than 6.5%.

WO-2008/043966, published on 17 Apr. 2008, describes fused particles without mentioning the addition of yttrium oxide.

Although prior art fused ceramic beads are of good quality, the industry is constantly looking out for even better quality products. Milling conditions are becoming ever more demanding and the efficiency of the equipment used needs to be increased in order to reduce operating costs. In particular, equipment down-time should be reduced.

The invention aims to satisfy these needs by providing fused ceramic particles that, in addition to the above-mentioned required qualities, have excellent breaking strength or a remarkable compromise between wear resistance and breaking strength.

SUMMARY OF THE INVENTION

The invention provides a novel fused ceramic particle, preferably in the form of a bead, having the following chemical composition, in percentages by weight based on the oxides and for a total of 100%:

50%<$ZrO_2$+$HfO_2$<70%;
10%<$SiO_2$<30%;
6.5%<MgO<9.5%;
$Al_2O_3$ in a quantity such that the MgO/$Al_2O_3$ weight ratio is in the range 2.4 to 6.6;
0.1%<$Y_2O_3$;
$CeO_2$<10%; and
less than 0.6% of other oxides.

The inventors have found that, unexpectedly, the presence of magnesia (MgO), alumina ($Al_2O_3$), and yttrium oxide ($Y_2O_3$) in the above-mentioned proportions substantially improves the properties of fused ceramic particles, especially in comparison with the particles described in FR 2 320 276. In particular, particles are obtained that have higher breaking strength in use.

The particles of the invention are thus particularly well suited to wet medium dispersion, micro-milling, and surface treatment applications. In the milling application, the particles of the invention have improved breaking strength on start-up and in service.

The invention also provides a set of particles comprising more than 90%, preferably more than 95%, more preferably approximately 100%, in percentages by weight, of particles of the invention.

The invention also provides a method of producing fused particles of the invention, especially fused beads, the method comprising the following steps in succession:

a) mixing starting materials to form a starting charge;
b) melting the starting charge until a molten material is obtained;
c) dispersing said molten material in the form of liquid droplets, and solidifying said liquid droplets in the form of solid particles (in particular beads).

According to the invention, the starting materials are selected in step a) such that the particles obtained in step c) are in accordance with the invention. Preferably, yttrium oxide, or even cerium oxide, is added deliberately and systematically to the starting charge in the form of the oxide or in the form of an oxide precursor, preferably in the oxide form, in order to guarantee this conformity.

Finally, the invention provides the use of a plurality of particles, especially beads of the invention, or beads produced using a method of the invention, as milling agents; wet medium dispersion agents; propping agents, especially for preventing the closure of deep geological fractures created in the walls of a well, in particular an oil well; heat exchange agents, for example for a fluidized bed; or for surface treatment.

DEFINITIONS

The term "particle" means a solid that is individualized in a powder.

The term "bead" means a particle having sphericity, i.e. the ratio between its smallest diameter and its largest diameter, of more than 0.6, regardless of the manner in which that sphericity has been obtained. Preferably, beads of the invention have a sphericity of more than 0.7.

The term "size" of a bead (or particle) is used for the mean of its largest dimension dM and its smallest dimension dm: (dM+dm)/2.

The term "fused bead" or, more broadly, "fused particle", means a solid bead (or particle) obtained by solidification of a molten material by cooling.

A "molten material" is a liquid mass that may contain a few solid particles, but in insufficient quantity for them to be able to endow said mass with any structure. In order to retain its shape, a molten material must be contained in a container.

The term "impurities" means inevitable constituents that are necessarily introduced with the starting materials. In particular, the compounds belonging to the group formed by oxides, nitrides, oxynitrides, carbides, oxycarbides, carbonitrides, and metallic species of sodium and other alkalis, iron, vanadium, and chromium are impurities. Examples that may be mentioned are CaO, $Fe_2O_3$ or $Na_2O$. Residual carbon forms such impurities in the composition of the products of the invention. In contrast, hafnium oxide is not considered to be an impurity.

In a product obtained by melting, $HfO_2$ cannot be chemically dissociated from $ZrO_2$. In the chemical composition of such a product, $ZrO_2+HfO_2$ thus designates the total quantity of these two oxides. However, in the present invention, $HfO_2$ is not deliberately added to the starting charge. Thus, $HfO_2$ denotes only traces of hafnium oxide, this oxide always being naturally present in sources of zirconia in quantities generally below 2%. To be clear, it should be understood that the quantity of zirconia with traces of hafnium oxide may equally well be referred to as $ZrO_2+HfO_2$, or $ZrO_2$, or even "zirconia content".

The term "precursor" of an oxide means a constituent that can supply said oxide during production of a particle of the invention.

Unless otherwise stated, all of the percentages given in the present description are percentages by weight based on the oxides.

Other characteristics and advantages become apparent from the following detailed description.

DETAILED DESCRIPTION

Method

In order to produce a product in accordance with exemplary embodiments of the invention, steps a) to c) mentioned above may be followed.

These steps are conventional, except insofar as they specify the composition of the starting charge; the skilled person is able to adapt them as a function of the envisaged application.

A preferred embodiment of this method is described below.

In step a), the starting charge is formed from the oxides indicated or from precursors thereof. Preferably, a natural zircon sand, $ZrSiO_4$, is used that contains approximately 66% of $ZrO_2$ and 33% of $SiO_2$, plus impurities. Adding $ZrO_2$ by using zircon is much cheaper than adding $ZrO_2$.

The compositions may be adjusted by adding pure oxides, mixtures of oxides, or mixtures of precursors of said oxides, in particular by adding $ZrO_2$, $SiO_2$, MgO, $Y_2O_3$, $CeO_2$, and $Al_2O_3$.

In the invention, the skilled person will adjust the composition of the starting charge in order to obtain particles in accordance with the invention at the end of step c). The chemical analysis of the fused ceramic particles of the invention is generally substantially identical to that of the starting charge. Furthermore, if necessary, for example in order to take into account the presence of volatile oxides, or in order to take into account the loss of $SiO_2$ when fusion is carried out under reducing conditions, the skilled person knows how to adapt the composition of the starting charge accordingly.

Preferably, no raw material other than $ZrO_2+HfO_2$, $SiO_2$, MgO, $Al_2O_3$, $Y_2O_3$, $CeO_2$, and their precursors is deliberately introduced into the starting charge; the other oxides that are present are impurities.

In step b), the starting charge is melted, preferably in an electric arc furnace. Electrofusion can be used to produce large quantities of particles (preferably in the form of beads) with high efficiency. However, any known furnace may be envisaged, such as an induction furnace or a plasma furnace, provided that they allow the starting charge to be substantially completely melted.

In step c), a filament of molten liquid is dispersed into small liquid droplets that, because of surface tension, mostly take on a substantially spherical shape. This dispersion may be carried out by blowing, in particular with air and/or steam, or by using any process for atomizing a molten material that is known to the skilled person. A molten ceramic particle with a size of 0.005 mm to 4 mm may thus be produced.

Cooling resulting from dispersion leads to solidification of the liquid droplets. Solid particles in accordance with the invention, in particular beads, are obtained.

Any conventional method of producing fused particles, especially fused beads, may be used, provided that the composition of the starting charge makes it possible to obtain particles with a composition in accordance with that of the particles of the invention. As an example, it is possible to produce a fused and cast block, then to mill it and, if necessary, to carry out grain size selection.

Particles

A fused ceramic particle of the invention has the following chemical composition, in percentages by weight based on the oxides and for a total of 100%:

50%<$ZrO_2+HfO_2$<70%;
10%<$SiO_2$<30%;
6.5%<MgO<9.5%;
$Al_2O_3$ in a quantity such that the MgO/$Al_2O_3$ weight ratio is in the range 2.4 to 6.6;
0.1%<$Y_2O_3$;
$CeO_2$<10%; and
less than 0.6% of other oxides.

In particular, when the MgO/$Al_2O_3$ weight ratio is in the range 4 to 5, and in particular when the MgO/$Al_2O_3$ weight ratio is approximately 4.2, and especially when $CeO_2$<0.6%, it is preferable for the yttrium oxide, $Y_2O_3$, content to be in the range 0.2% to 5% in order to favor wear resistance, and for it to be in the range 1.7% to 5.5% in order to favor the breaking strength. For the applications mentioned above, and in particular for a milling application, when the $MgO/Al_2O_3$ weight ratio is in the range 4 to 5, and especially when the $MgO/Al_2O_3$ weight ratio is approximately 4.2 and/or when $CeO_2$<0.6%, an yttrium oxide, $Y_2O_3$, content in the range 1.7% to 5%, more preferably in the range 2.5% to 5% is considered to be optimal. An yttrium oxide, $Y_2O_3$, content of approximately 4.1% is preferred.

In exemplary embodiments, the quantity by weight of yttrium oxide, $Y_2O_3$, is less than 6.0%, or even less than 5.5%, and the $MgO/Al_2O_3$ weight ratio is more than 5 or more than 6, or less than 4 or less than 3.

In the context of a composition of the invention, a technical effect on the breaking strength may be associated with the presence of yttrium oxide, even in low quantities. Preferably, the quantity by weight of yttrium oxide, $Y_2O_3$ is more than 0.2%, more than 0.25%, more than 0.6%, more than 1.7%, more than 2.5%, more than 3.0%, more than 3.5%, or even more than 3.8%.

Too large a quantity of yttrium oxide, $Y_2O_3$, however, results in a substantial increase in the production cost of the particles. Furthermore, the compromise between breaking strength and wear resistance is degraded. Preferably, and especially when $CeO_2$<0.6%, the quantity by weight of yttrium oxide, $Y_2O_3$, is less than 7.2%, less than 7.0%, less than 6.5%, less than 6.0%, less than 5.5%, less than 5.0%, less than 4.5%, or even less than 4.2%.

More preferably, a fused ceramic particle in accordance with the invention has an $MgO/Al_2O_3$ weight ratio of more than 3, preferably more than 3.5, preferably more than 3.7, preferably more than 4.0, or even more than 4.2.

More preferably, a fused ceramic particle in accordance with the invention has an $MgO/Al_2O_3$ weight ratio of less than 6, preferably less than 5.5, preferably less than 5, or even less than 4.5. Preferably, the $MgO/Al_2O_3$ weight ratio is substantially 4.25.

A fused ceramic particle of the invention preferably includes an Mgo content of more than 7%, more than 7.5%, preferably more than 8%, or even more than 8.5% by weight. It preferably includes a weight content of MgO of less than 9.3%, or even less than 9%.

Similarly, a fused ceramic particle of the invention preferably comprises a weight content of $Al_2O_3$ of more than 1.2%, preferably more than 1.4%, preferably more than 1.6%, preferably more than 1.8%. The weight content of $Al_2O_3$ is preferably less than 3.2%, less than 2.8%, preferably less than 2.5%, preferably less than 2.2%.

The quantities of zirconia and silica also influence the performance of a particle in accordance with the invention.

Preferably, a fused ceramic particle of the invention comprises a weight content of $ZrO_2$ of more than 56%, or even more than 58%. Preferably, this weight content is less than 68%, preferably less than 65%, or even less than 62%, or even less than 61%, or even less than 60%.

Preferably, a fused ceramic particle of the invention comprises a weight content of $SiO_2$ of more than 15%, preferably more than 16%, more than 18%, preferably more than 20%, more preferably more than 22%, preferably more than 25%. Preferably, this weight content is less than 29%, preferably less than 28%, or even less than 27%.

$CeO_2$ may be an impurity. Under such circumstances, and preferably, the $CeO_2$ content is less than $CeO_2$<0.6%. More preferably, the $CeO_2$ content is less than 0.5%, as a percentage by weight based on the oxides. In a variation, in applications in which a high density is advantageous, $CeO_2$ is deliberately added; preferably, its content is more than 1%, more preferably more than 6%. Still more preferably, its content is less than 9.5%. A quantity of approximately 9% is considered to be optimal.

The "other oxides" are preferably only present in the form of impurities. A total quantity of "other oxides" of less than 0.6% is considered not to substantially modify the results obtained. However, preferably, the quantity of "other oxides" as a percentage by weight based on the oxides is less than 0.5%, preferably less than 0.45%, or even less than 0.3%, or less than 0.1%.

Preferably, the total quantity of impurities, as a percentage by weight based on the oxides, is less than 0.5%, preferably less than 0.45%.

Still more preferably, the oxides content of a particle of the invention represents more than 99.5%, preferably more than 99.9%, and more preferably, substantially 100% of the total mass of said particle.

A preferred particle in accordance with the invention has the following chemical composition, in percentages by weight based on the oxides and for a total of 100%:

56%<$ZrO_2$+$HfO_2$<62%, preferably 58%<$ZrO_2$+$HfO_2$<61%;

15%<$SiO_2$<28%;

8%<MgO<9.5%;

$Al_2O_3$ in a quantity such that the $MgO/Al_2O_3$ weight ratio is in the range 4.2 to 5;

0.1%<$Y_2O_3$, preferably $Y_2O_3$<7%, preferably 0.2%<$Y_2O_3$<6%, more preferably 0.6%<$Y_2O_3$<5.5%, still more preferably 1.7%<$Y_2O_3$<5%;

$CeO_2$<10%, in particular in variations in which $CeO_2$ is an impurity (and in particular $CeO_2$<0.6%, or even $CeO_2$<0.5%), and where 1%<$CeO_2$ (preferably 6%<$CeO_2$) and $CeO_2$<9.5%; and less than 0.5% of other oxides.

A fused ceramic particle of the invention may in particular have a size of less than 4 mm and/or more than 0.005 mm.

Shapes other than "beads" are possible in the context of the invention, but the substantially spherical shape is preferred.

Fused particles of the invention have high breaking strength and wear resistance.

Without wishing to be bound by any particular theory, the inventors explain these performances by the improvement in the cohesion of the zirconia crystals with the vitreous phase (silica glass).

The fused ceramic particles of the invention are particularly well suited to act as milling agents and wet medium dispersion agents, as well as agents for the treatment of surfaces. Thus, the invention also provides the use of a plurality of particles, in particular beads of the invention, or beads produced using a method of the invention, as milling agents, wet medium dispersion agents, or for the treatment of surfaces.

However, it should be noted that the properties of beads, especially their strength, their density, and their ease of production, may render them appropriate for other applications, especially as dry milling agents, propping agents, and heat exchange agents.

EXAMPLES

The following non-limiting examples are given with the aim of illustrating the invention.

Measurement Protocols

The following methods were used to determine certain properties of various mixtures of fused ceramic beads. They provide an excellent simulation of the actual service behavior in a milling application.

In order to determine the wear resistance, 20 mL [milliliter] (volume measured using a graduated tube) of test beads with size in the range 0.8 mm to 1 mm were weighed (mass $m_0$) and introduced into one of 4 jars coated with dense sintered alumina, with a capacity of 125 mL, of a rapid planetary mill of the PM400 type from the supplier RETSCH. 2.2 g of silicon carbide from the supplier Presi (with a median dimension D50 of 23 µm [micrometer]) and 40 mL of water were added to the jar already containing the beads. The jar was closed and rotation was commenced (planetary motion) at 400 rpm [revolutions per minute], reversing the direction of rotation every minute, for 1 h 30. The contents of the jar were then washed through a 100 µm sieve in order to remove residual silicon carbide as well as detritus due to wear during milling. After sieving through a 100 µm sieve, the particles were then oven dried at 100° C. for 3 h [hour] and weighed (mass m).

The wear was expressed as a percentage (%) and was equal to the weight loss of the beads over the initial mass of the beads, i.e.:

$$100(m_0-m)/(m_0)$$

In order to test the breaking strength of the beads, extreme conditions had to be applied in order to result in breakage phenomena in a mill under normal operating conditions.

A horizontal type pressurized mill was provided with fingers on the rotor and counter-fingers on the interior of the tank. This mill, with a volume of 1.2 liter, was charged with 50% by volume of beads with the test grain size (apparent volume), corresponding to an initial mass of beads $m_i$.

Before commencing rotation of the mill and throughout the test period, the chamber was supplied with water at a flow rate of 6 L/h [liter/hour]. The linear velocity at the end of the fingers of the rotor was fixed at 7.3 m/s [meter/second] for 30 minutes.

Once the test was completed, the beads were removed from the tank, dried, and then sieved. The beads were all sorted manually in order to remove the broken beads, which were then weighed. The weight of broken beads was equal to $m_{bc}$. The percentage of broken beads was equal to $100 \times m_{bc}/m_i$.

Production Protocol

In the examples, the starting charge used was a composition based on zircon, with added magnesium oxide, yttrium oxide, and aluminum oxide. This starting charge was melted in a Héroult type electric arc furnace. The molten material was then dispersed into beads by compressed air blowing.

Several fuse/cast cycles were carried out, adjusting the quantities of magnesium, yttrium, and aluminum oxides in particular.

Since the beads that are most likely to break when used were beads with a size of more than 1.6 mm, the breaking strength test described above was carried out on a 1.6 mm to 2.5 mm grain-size range.

Results

The results obtained are summarized in Table 1 below.

TABLE 1

| Ex. | ZrO$_2$ + HfO$_2$ % | SiO$_2$ % | MgO % | Al$_2$O$_3$ % | Y$_2$O$_3$ % | Other oxides % | MgO/ Al$_2$O$_3$ | $M_i$ g | $M_{bc}$ g | % broken beads | Improvement in breakage as % relative to Ref. 1 | Ref. 2 | Ref. 3 | Wear % |
|---|---|---|---|---|---|---|---|---|---|---|---|---|---|---|
| Ref. 1 | 69.6 | 29.3 | 0.01 | 0.74 | 0.09 | 0.26 | 0.01 | 1365.7 | 11.06 | 0.81 | — | — | | 8.24 |
| Ref. 2 | 61.5 | 27.3 | 8.57 | 2.22 | 0.08 | 0.33 | 3.86 | 1387.2 | 5.13 | 0.37 | 54.32 | — | | 3.74 |
| 1 | 60.9 | 26.7 | 9.13 | 2.03 | 0.87 | 0.37 | 4.5 | 1388.4 | 3.47 | 0.25 | 69.14 | 32.43 | | 2.31 |
| 2 | 61.2 | 25.8 | 8.86 | 2.1 | 1.76 | 0.28 | 4.22 | 1390.7 | 2.36 | 0.17 | 79.01 | 54.05 | | 2.06 |
| 3 | 59.1 | 26.7 | 8.94 | 2.05 | 2.81 | 0.4 | 4.36 | 1385.6 | 1.80 | 0.13 | 83.95 | 64.86 | | 1.68 |
| 4 | 58.4 | 26.3 | 8.76 | 2.06 | 4.06 | 0.42 | 4.25 | 1391.2 | 1.67 | 0.12 | 85.19 | 67.57 | | 1.67 |
| 5 | 56.1 | 25.7 | 8.61 | 2.18 | 7.1 | 0.31 | 3.95 | 1392.3 | 5.15 | 0.37 | 54.32 | 0 | | 2.52 |
| Ref. 3 | 60.9 | 27.1 | 8.73 | 2.83 | 0.09 | 0.35 | 3.08 | 1385.6 | 9 | 0.65 | 19.75 | — | — | 3.81 |
| 6 | 59 | 27.2 | 9.06 | 2.88 | 1.59 | 0.27 | 3.15 | 1389.6 | 3.2 | 0.33 | 71.6 | — | 49.23 | 2.13 |
| 7 | 63.8 | 28.4 | 5.52 | 1.37 | 0.62 | 0.29 | 4.03 | 1388.8 | 5.83 | 0.42 | — | −13.51 | | 3.51 |
| 8 | 55 | 24.7 | 10.52 | 2.53 | 7.02 | 0.23 | 4.16 | 1393.1 | 5.57 | 0.4 | — | −8.11 | | 3.33 |
| 9 | 62.1 | 27 | 6.73 | 3.21 | 0.64 | 0.32 | 2.10 | 1387.9 | 7.08 | 0.51 | — | −37.84 | | 3.42 |
| 10 | 58.4 | 25.6 | 7.81 | 1.03 | 6.78 | 0.38 | 7.58 | 1392.7 | 6.27 | 0.45 | — | −21.62 | | 2.83 |

The reference beads of the example, "Ref 1", not in accordance with the invention, were beads that are routinely used in milling applications. The reference beads of the examples "Ref 2" and "Ref 3" form the subject matter of International patent application FR2007/052127.

The breaking strength of the beads of the example Ref 2, which have an MgO/Al$_2$O$_3$ ratio of more than 3.5, was higher than that of the beads of the example Ref 3.

The beads of Examples 7 to 10 are examples that do not fall within the scope of the invention.

It is considered that the results are particularly satisfactory if the beads exhibit the following:

an improvement in the breaking strength of at least 10% relative to that of the reference; and an improvement in the wear resistance of at least 10% relative to that of the reference.

Examples 1 to 6 show that, surprisingly, the test beads of the invention exhibit remarkable performance over the reference beads both as regards wear resistance and as regards breaking strength, with the exception of Example 5 where only an improvement in wear resistance was obtained. Example 5 thus shows that excessive addition of yttrium oxide is deleterious to breaking strength.

Example 7, not in accordance with the invention, shows that for an MgO/Al$_2$O$_3$ ratio of the order of 4, an MgO content of approximately 5.5% cannot improve the breaking strength.

Example 8, not in accordance with the invention, shows, moreover, that for an Mgo/Al$_2$O$_3$ ratio of the order of 4, an Mgo content of approximately 10.5% cannot improve the breaking strength.

Examples 9 and 10, not in accordance with the invention, illustrate the necessity for the MgO/Al$_2$O$_3$ ratio to be in the range 2.4 to 6.6 in order to improve breaking strength.

The composition of the beads of Example 4 is the most preferred.

Clearly, the present invention is not limited to the embodiments described, which are provided as illustrative, non-limiting examples.

What is claimed is:

1. A fused ceramic particle having the following chemical composition:

$50\% < ZrO_2+HfO_2 < 70\%$;
$10\% < SiO_2 < 30\%$;
$6.5\% < MgO < 9.5\%$;
$Al_2O_3$ in a quantity such that the $MgO/Al_2O_3$ weight ratio is in the range 2.4 to 6.6;
$0.1\% < Y_2O_3$;
$CeO_2 < 10\%$; and
less than 0.6% of oxides other than $ZrO_2+HfO_2$, $SiO_2$, MgO, $Al_2O_3$, $Y_2O_3$ and $CeO_2$,
in percentages by weight based on the oxides and for a total of 100%.

2. A particle according to claim 1, wherein the $Y_2O_3$ content, as a percentage by weight based on the oxides, is more than 0.25% and less than 7.0%.

3. A particle according to claim 2, wherein the $Y_2O_3$ content, as a percentage by weight based on the oxides, is more than 0.25% and less than 6%.

4. A particle according to claim 3, wherein the $Y_2O_3$ content, as a percentage by weight based on the oxides, is more than 0.6% and less than 5.5%.

5. A particle according to claim 4, wherein the $Y_2O_3$ content, as a percentage by weight based on the oxides, is more than 1.7% and less than 5%.

6. A particle according to claim 1, wherein the $ZrO_2$ content, as a percentage by weight based on the oxides, is more than 56% and less than 62%.

7. A particle according to claim 1, wherein the $SiO_2$ content, as a percentage by weight based on the oxides, is more than 15% and less than 28%.

8. A particle according to claim 1, wherein the MgO content, as a percentage by weight based on the oxides, is more than 8%.

9. A particle according to claim 1, wherein the $MgO/Al_2O_3$ weight ratio is 4.2 or more and 5 or less.

10. A particle according to claim 1, having the following chemical composition:
$56\% < ZrO_2+HfO_2 < 62\%$;
$15\% < SiO_2 < 28\%$;
$8\% < MgO < 9.5\%$;
$Al_2O_3$ in a quantity such that the $MgO/Al_2O_3$ weight ratio is in the range 4.2 to 5;
$0.2\% < Y_2O_3 < 5\%$;
$CeO_2 < 10\%$; and
less than 0.5% of oxides other than $ZrO_2+HfO_2$, $SiO_2$, MgO, $Al_2O_3$, $Y_2O_3$ and $CeO_2$,
in percentages by weight based on the oxides and for a total of 100%.

11. A particle according to claim 10, comprising more than 0.6% of yttrium oxide.

12. A particle according to claim 1, having a $CeO_2$ content of less than 0.6%.

13. A particle according to claim 1, having a $CeO_2$ content of more than 6%.

14. A method of producing a set of particles, each particle of said set being a particle according to claim 1, said method comprising the following steps in succession:
a) mixing starting materials to form a starting charge;
b) melting the starting charge until a molten material is obtained;
c) dispersing said molten material in the form of liquid droplets, and solidifying said liquid droplets in the form of solid particles;
in which method the starting materials are selected in step a) such that each of said solid particles obtained in step c) has the following chemical composition, in percentages by weight based on the oxides and for a total of 100%:
$50\% < ZrO_2+HfO_2 < 70\%$,
$10\% < SiO_2 < 30\%$,
$6.5\% < MgO < 9.5\%$,
$Al_2O_3$ in a quantity such that the $MgO/Al_2O_3$ weight ratio is in the range 2.4 to 6.6,
$0.1\% < Y_2O_3$,
$CeO_2 < 10\%$, and
less than 0.6% of oxides other than $ZrO_2+HfO_2$, $SiO_2$, MgO, $Al_2O_3$, $Y_2O_3$ and $CeO_2$,
yttrium oxide not being an impurity.

15. An agent selected from the group consisting of milling agents, wet medium dispersion agents, propping agents, heat exchange agents, and surface treatment agents, said agent comprising:
a plurality of particles, each particle of said plurality being a particle according to claim 1.

* * * * *